UNITED STATES PATENT OFFICE.

WALTER SCHOELLER AND WALTHER SCHRAUTH, OF BERLIN, GERMANY, ASSIGNORS TO FARBENFABRIKEN VORM. FRIEDR. BAYER & CO., OF ELBERFELD, GERMANY, A CORPORATION OF GERMANY.

SECONDARY ALKALI SALTS OF ORTHOÖXYMERCURIC SALICYLIC ACID.

967,839.    Specification of Letters Patent.    Patented Aug. 16, 1910.

No Drawing.    Application filed May 20, 1909.    Serial No. 497,303.    (Specimens.)

*To all whom it may concern:*

Be it known that we, WALTER SCHOELLER and WALTHER SCHRAUTH, doctors of philosophy, chemists, citizens of the German Empire, residing at Berlin, Germany, have invented new and useful Improvements in Secondary Alkali Salts of Orthoöxymercuric Salicylic Acid, of which the following is a specification.

Our present invention relates to the preparation of the hitherto unknown secondary alkaline salts of the ortho-oxymercuric salicylic acid of the formula:

("M" standing for an alkali metal.) These products can be obtained by dissolving the ortho-oxymercuric salicylic anhydrid (hydrargyrum salicylicum) in two molecular proportions of caustic alkali lye, concentrating the solution, treating it with alcohol and precipitating the new compounds from the alcoholic solution either by the addition of ether, or any other similar method. The new compounds thus obtained are slightly colored odorless compounds which are very easily soluble in water, soluble in methyl alcohol and insoluble in ether. The disodium salt is easily soluble in methylic alcohol and the corresponding calcium salt is easily soluble in a large quantity of water. They have proved to be valuable antisyphilitics characterized by a mild action and the fact that they are non-irritant and not corrosive renders them highly valuable for internal application especially for subcutaneous injection. They can be used for preparing tablets by means of which aqueous solutions of a distinct amount of mercury can be prepared with the greatest ease.

The new compounds have proved to be valuable disinfecting agents possessing great disinfecting power. They possess the advantage over mercuric chlorid that they do not precipitate albumen that is to say that they are not irritant and that the mercury contained therein does not blacken surgical instruments.

In order to illustrate our new process the following example is given, the parts being by weight:—20 parts of the ortho-oxymercuric compound of salicylic acid anhydrid (hydrargyrum salicylicum) are dissolved in an aqueous solution of 4.76 parts of NaOH (2 molecular proportions). The solution is then evaporated *in vacuo* to dryness. A brown syrup remains. On standing the disodium compound of the ortho-oxymercuric compound of salicylic acid separates in crystals. The whitish product is soluble in methyl alcohol. From this solution it can be precipitated again with ether. The same salt results by dissolving the anhydrid in 2 molecular proportions of NaOH in methyl alcohol and precipitating with ether.

The formation of the new compound probably takes place according to the following formula:

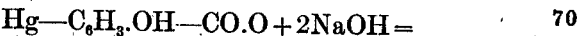

On analysis the new compound is found to have the formula:

containing 50.22 per cent. of mercury.

We claim:

1. The herein described new secondary alkaline salts of ortho-oxymercuric salicylic acid of the above given formula obtainable from the ortho-oxymercuric compound of salicylic acid anhydrid, which are slightly colored compounds easily soluble in water, soluble in methyl alcohol and insoluble in ether; which do not precipitate albumen; and are valuable therapeutic compounds, substantially as described.

2. The herein described new secondary sodium salt of ortho-oxymercuric salicylic acid of the above given formula obtainable from the ortho-oxymercuric compound of salicylic acid anhydrid, which is a whitish product easily soluble in water, soluble in methyl alcohol and insoluble in ether, which does not precipitate albumen; and is a valuable therapeutic compound, substantially as described.

In testimony whereof we have hereunto set our hands in the presence of two subscribing witnesses.

WALTER SCHOELLER.
WALTHER SCHRAUTH.

Witnesses:
HENRY HASPER,
WOLDEMAR HAUPT.